United States Patent
Mauritz

(10) Patent No.: US 10,708,817 B2
(45) Date of Patent: *Jul. 7, 2020

(54) RANDOM ACCESS PREAMBLE DESIGN

(71) Applicant: HUAWEI TECHNOLOGIES CO., LTD., Shenzhen, Guangdong (CN)

(72) Inventor: Oskar Mauritz, Stockholm (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,096

(22) Filed: Apr. 8, 2019

(65) Prior Publication Data

US 2019/0239119 A1     Aug. 1, 2019

Related U.S. Application Data

(63) Continuation of application No. 14/557,088, filed on Dec. 1, 2014, now Pat. No. 10,285,092, which is a continuation of application No. 14/045,554, filed on Oct. 3, 2013, now Pat. No. 8,913,696, which is a continuation of application No. 12/605,616, filed on Oct. 26, 2009, now Pat. No. 8,599,974, which is a continuation of application No. PCT/CN2008/070768, filed on Apr. 22, 2008.

(30) Foreign Application Priority Data

Apr. 30, 2007   (CN) ............................. 2007 1 0074200

(51) Int. Cl.
*H04W 28/06* (2009.01)
*H04J 13/00* (2011.01)
*H04W 74/08* (2009.01)
*H04J 13/14* (2011.01)

(52) U.S. Cl.
CPC ....... *H04W 28/065* (2013.01); *H04J 13/0055* (2013.01); *H04W 74/0833* (2013.01); *H04J 13/14* (2013.01)

(58) Field of Classification Search
CPC ............... H04W 28/065; H04W 28/02; H04W 74/0833; H04W 74/08; H04J 13/0055; H04J 13/0007; H04J 13/14; H04J 13/10
USPC ......................................................... 370/329
See application file for complete search history.

(56) References Cited

U.S. PATENT DOCUMENTS

| 8,098,745 B2 * | 1/2012 | Bertrand | H04J 13/00 375/130 |
| 9,118,531 B2 * | 8/2015 | Lee | H04J 13/14 |

* cited by examiner

Primary Examiner — Kwang B Yao
Assistant Examiner — Syed M Bokhari
(74) Attorney, Agent, or Firm — James Anderson Harrison

(57) ABSTRACT

A communication method performed by a base station in a wireless communication network is disclosed. The base station notifies a terminal of a cyclic shift increment $N_{CS}$ configuration information indicating an $N_{CS}$ value. The base station then receives from the terminal a random access preamble related to the $N_{CS}$ value indicated by the $N_{CS}$ configuration information. The $N_{CS}$ value belongs to a set of cyclic shift increments including all of the following cyclic shift increments of 0, 13, 15, 18, 22, 26, 32, 38, 46, 59, 76, 93, 119, 167, 279, 419.

26 Claims, 3 Drawing Sheets

RANDOM ACCESS PREAMBLE DESIGN

CROSS-REFERENCE TO RELATED APPLICATIONS

This application is a continuation of U.S. patent application Ser. No. 14/557,088, filed on Dec. 1, 2014, which is a continuation of U.S. patent application Ser. No. 14/045,554, filed on Oct. 3, 2013, now U.S. Pat. No. 8,913,696. The U.S. patent application Ser. No. 14/045,554 is a continuation of U.S. patent application Ser. No. 12/605,616, filed on Oct. 26, 2009, now U.S. Pat. No. 8,599,974. The U.S. patent application Ser. No. 12/605,616 is a continuation of International Patent Application No. PCT/CN2008/070768, filed on Apr. 22, 2008, which claims priority to Chinese Patent Application No. 200710074200.1, filed on Apr. 30, 2007. All of the above described applications are hereby incorporated herein by reference.

TECHNICAL FIELD

The disclosure relates to the technology of mobile communication, and more particularly, to the design of a Random Access Preamble (RAP).

BACKGROUND

In a mobile communication system, a Random Access Preamble is normally transmitted to a base station by a mobile terminal to initiate the random access procedure and to enable synchronization of the mobile terminal with the base station.

There are 64 preambles in each cell in the document of "3GPP TS 36.211 v1.0.0—Physical Channels and Modulation" which was published in March 2007. When initiating a random access procedure, a mobile terminal transmits one of the 64 preambles. A message is transmitted to a base station by the mobile terminal selecting a particular preamble.

Before transmitting the preamble, a mobile terminal must synchronize to the carrier frequency and the frame timing of a base station to become downlink synchronized. Although the mobile terminal is downlink synchronized, there is uncertainty when a signal transmitted by the mobile terminal arrives at the base station. This is because a mobile terminal far away from the base station will receive downlink signals with a larger delay than a mobile terminal close to the base station, and the transmitted signals in uplink will take longer time to propagate to the base station for a mobile terminal which is far away from the base station compared to the signals from a mobile terminal close to the base station. The uncertainty in round trip time causes interferences between uplink signals transmitted by different mobile terminals unless uplink synchronization is performed before data transmission in uplink.

The transmission of any of the RAPs allows a base station to estimate the time of arrival of an uplink signal. The base station can then, based on the time of arrival estimate transmit a time advance command to a mobile terminal to ensure uplink synchronization. Hence, once a preamble is transmitted by a mobile terminal, the base station may detect which preamble has been transmitted and estimate the time of arrival.

To obtain good detection properties of the preambles, or to accurately estimate the time of arrival of the uplink signal, the set of preambles should be designed to have good autocorrelation and cross-correlation properties.

The set of RAPs in Evolved UTRA (E-UTRA) is defined from one or several root sequences. A subset of the preambles $x_{u,v}(k)$ is generated from the $u^{th}$ order root Zadoff-Chu (ZC) sequence $x_u(k)$ by cyclic shifts of a plurality of the shift increments $N_{CS}$. Specifically, $x_{u,v}(k)$ may be generated according to the equation below:

$$x_{u,v}(k)=x_{u,v}((k+vN_{CS}) \bmod N_{ZC}), \quad (1)$$

where v is an integer, and $N_{ZC}$ is the length of the ZC sequence defined by:

$$x_u(k)=W^{uk(k+1)/2}, k=0,1,\ldots,N_{ZC}-1,$$
$$W=e^{-j2\pi/N_{ZC}}, j=\sqrt{-1} \quad (2)$$

The number of preambles that may be generated from a single root sequence is $N_{pre}=\lfloor N_{ZC}/N_{CS} \rfloor$, where $\lfloor n \rfloor$ denotes the largest integer not greater than n. If $N_{pre}<64$, then several preamble subsets generated from different root sequences are required to obtain 64 preambles in a cell. The cross-correlation between different root sequences is small but still larger than the cross-correlation between sequences generated by a single root sequence. Thus it is beneficial for the detection performance to have $N_{pre}=64$ if $N_{pre}$ could not be set greater.

The number of ZC sequences contained in each set of ZC sequences with length of $N_{ZC}$ is $N_{ZC}-1$. If the number of root sequences for obtaining the 64 preambles of a cell is $N_r$, $N_r=\lceil 64/Npre \rceil$, where $\lceil n \rceil$ denotes the minimal integer not smaller than n, then the number of disjoint sets is $N_D=\lfloor (N_{ZC}-1)/N_r \rfloor$. Different cells in a network should make use of preambles obtained from disjoint sets of root sequences, so that the base station knows whether a transmitted preamble is intended for a certain cell or not. The larger the number of root sequences $N_r$ that is needed for obtaining 64 preambles in a cell, the smaller is the number of disjoint sets of RAPs $N_D$. Thus, from network planning perspective it is desirable to have $N_{pre}=64$, and if that is not possible to have as high value as possible of $N_{pre}$.

A subset of preambles generated with equation (1) is a set of so-called Zero-Correlation Zone (ZCZ) sequences. The definition for a set of ZCZ sequences is as follows: a set of M sequences $\{d_v(k)\}$, v=0, 1, ..., M−1, k=0, 1, ..., N−1, of length N, is said to be a set of ZCZ sequences, if all the sequences in the set satisfy the following autocorrelation and cross-correlation properties:

The periodic autocorrelation function $\Sigma_{k=0}^{N-1}d_v(k)d^*_v((k+p) \bmod N)$ is zero for all p such that $0<|p|\leq T$, and the periodic cross-correlation function $\Sigma_{k=0}^{N-1}d_v(k)d^*_w((k+p) \bmod N)$ is zero for all p such that $|p|\leq T$ (including p=0), where T is the length of the ZCZ.

A ZC sequence has ideal periodic autocorrelation, for example, $\Sigma_{k=0}^{N-1}x_u(k)x^*_u((k+p) \bmod N)$ is zero for all nonzero p. Thus the set of preambles defined as cyclic shifts of the root sequence according to equation (1) is a set of ZCZ sequences, where the ZCZ length is $T=N_{CS}-1$.

Based on $N_{pre}=\lfloor N_{ZC}/N_{CS} \rfloor$, $N_{CS}$ should be as small as possible in order to make $N_{pre}$ be as great as possible. But the value of $N_{CS}$ should not be too small. In a base station a bank of correlators are used when receiving RAPs, so that there is one correlator for each preamble. Each correlator outputs time of arrival from 0 to $T \times T_s = (N_{CS}-1) \times T_s$, where $T_s$ is the symbol period of the sequence. The ZCZ property of the set of preambles implies that the correlator for any preamble will give a zero output if any other preamble is transmitted as long as the sum of the round trip time and delay spread in the cell is less than or equal to the product of the length of ZCZ and $T_s$ (i.e., $T \times T_s$). The maximum round trip time $T_r$ in a cell is given by the cell radius R:

$T_r=2R/c$, where c is the speed of light. Thus, the minimum value of the length of ZCZ and the minimum value of $N_{CS}$ length for a certain cell increase with the cell radius. Therefore, the value of the selected $N_{CS}$ should be large enough to ensure that the conditions mentioned above are satisfied.

Since the cell radius to be supported in E-UTRA is from 1 km to 100 km, and since $N_{CS}$ should be as small as possible for any given cell, there is a need for multiple values of $N_{CS}$. The value of an $N_{CS}$ in a cell is broadcast to a mobile terminal by a base station. Of course, the base station may broadcast the length of ZCZ to the mobile terminal, so that the mobile terminal knows how to generate preambles. It is desirable to have as small amount of signaling as possible on the broadcast channel to save overload. Therefore, to achieve low signaling overload, there should be a limited predefined set of values of $N_{CS}$ or a set of lengths of ZCZ.

Currently, it is proposed in the 3GPP Tdoc "R1-071661—On construction and signaling of RACH preambles" disclosed in March 2007 that, the cyclic shift increment value $N_{CS}$ in the cell was proposed to be signalled to the UE but there was no restriction on the values of the cyclic shift increment, which would then give a substantial amount of signalling. An alternative proposal is given in the 3GPP Tdoc "R1-071471—Outstanding issues in random access preamble design for E-UTRA" disclosed in March 2007, which is to have 11 values of $N_{CS}$ without specification how to select the values. Of course, it is not described in these documents how to select the lengths of ZCZ either. Currently there is no feasible scheme for selecting an appropriate limited set of ZCZ lengths, in order to ensure a small and limited signaling overload.

SUMMARY

According to a first aspect of the disclosure, a method of facilitating a user equipment (UE) communicating with a base station (BS) via a cell of a mobile communications system is provided. The UE selects a random access preamble (RAP) from a set of RAPs, and transmits the RAP to the BS. The BS receives the RAP, and estimates a time of arrival of the RAP. The set of RAPs is included in 64 RAPs available in the cell. The 64 RAPs are obtained from at least one Zadoff-Chu sequence. The at least one Zadoff-Chu sequence is used in generation of RAP sequences $x_{u,v}(k)$ for the 64 RAPs. $x_{u,v}(k)$ is given by: $x_{u,v}(k)=x_{u,v}((k+vN_{CS}) \mod N_{ZC})$, where u and v are integers, $N_{ZC}$ is a length of the at least one Zadoff-Chu sequence, $N_{CS}$ is given by a pre-defined set including all of the following values: 0, 13, 15, 18, 22, 26, 32, 38, 46, 59, 76, 93, 119, 167, 279, 419. And Zadoff-Chu sequence is defined by: $x_u(k)=W^{uk(k+1)/2}$, $k=0, 1, \ldots, N_{ZC}-1$, $W=e^{-j2\pi/N_{ZC}}$, $j=\sqrt{-1}$.

According to a second aspect of the disclosure, a mobile communications system is provided. The system includes a UE in communication with a BS via a cell of the system. The UE is configured to select a RAP from a set of RAPs, and transmit the RAP to the BS. The BS is configured to receive the RAP, and estimate a time of arrival of the RAP. The set of RAPs is included in 64 RAPs available in the cell. The 64 RAPs are obtained from at least one Zadoff-Chu sequence. The at least one Zadoff-Chu sequence is used in generation of RAP sequences $x_{u,v}(k)$ for the 64 RAPs. $x_{u,v}(k)$ is given by:

$$x_{u,v}(k)=x_{u,v}((k+vN_{CS}) \mod N_{ZC}),$$

where u and v are integers, $N_{ZC}$ is a length of the at least one Zadoff-Chu sequence, $N_{CS}$ is given by a pre-defined set including all of the following values: 0, 13, 15, 18, 22, 26, 32, 38, 46, 59, 76, 93, 119, 167, 279, 419. And Zadoff-Chu sequence is defined by:

$$x_u(k)=W^{uk(k+1)/2}, k=0,1,\ldots,N_{ZC}-1,$$
$$W=e^{-j2\pi/N_{ZC}}, j=\sqrt{-1}.$$

According to a third aspect of the disclosure, a UE is provided. The UE includes a memory retaining instructions and a processor coupled to the memory. The processor is configured to execute the instructions retained in the memory. The instructions relate to the UE selecting an RAP from a set of RAPs, and the UE transmitting the RAP to a BS. The UE is capable of communicating with the BS via a cell of a mobile communications system. The set of RAPs is included in 64 RAPs available in the cell. The 64 RAPs are obtained from at least one Zadoff-Chu sequence. The at least one Zadoff-Chu sequence is used in generation of RAP sequences $x_{u,v}(k)$ for the 64 RAPs. $x_{u,v}(k)$ is given by:

$$x_{u,v}(k)=x_{u,v}((k+vN_{CS}) \mod N_{ZC}),$$

where u and v are integers, $N_{ZC}$ is a length of the at least one Zadoff-Chu sequence, $N_{CS}$ is given by a pre-defined set including all of the following values: 0, 13, 15, 18, 22, 26, 32, 38, 46, 59, 76, 93, 119, 167, 279, 419. And Zadoff-Chu sequence is defined by:

$$x_u(k)=W^{uk(k+1)/2}, k=0,1,\ldots,N_{ZC}=1,$$
$$W=e^{-j2\pi/N_{NC}}, j=\sqrt{-1}.$$

According to a fourth aspect of the disclosure, a BS is provided. The BS includes a memory retaining instructions and a processor coupled to the memory. The processor is configured to execute the instructions retained in the memory. The instructions relate to the BS receiving an RAP and estimating a time of arrival of the RAP. The RAP is selected from a set of RAPs. The BS is capable of communicating with a UE via a cell of a mobile communications system. The set of RAPs is included in 64 RAPs available in the cell. The 64 RAPs are obtained from at least one Zadoff-Chu sequence. The at least one Zadoff-Chu sequence is used in generation of RAP sequences $x_{u,v}(k)$ for the 64 RAPs. $x_{u,v}(k)$ is given by: $x_{u,v}(k)=x_{u,v}((k+vN_{CS}) \mod N_{ZC})$, where u and v are integers, $N_{ZC}$ is a length of the at least one Zadoff-Chu sequence, $N_{CS}$ is given by a pre-defined set including all of the following values: 0, 13, 15, 18, 22, 26, 32, 38, 46, 59, 76, 93, 119, 167, 279, 419. And Zadoff-Chu sequence is defined by:

$$x_u(k)=W^{uk(k+1)/2}, k=0,1,\ldots,N_{ZC}-1,$$
$$W=e^{-j2\pi/N_{NC}}, j=\sqrt{-1}.$$

DESCRIPTION OF EMBODIMENTS

Figure 1:
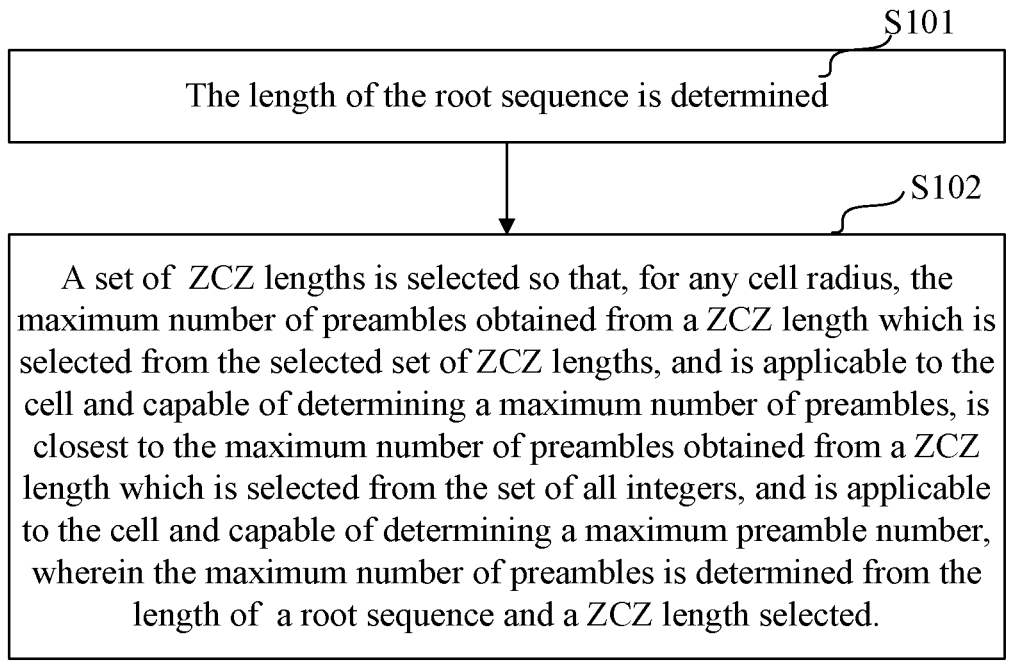
FIG. 1 is a flow chart illustrating an method embodiment of the disclosure.

The general solution of an embodiment of the disclosure is described first, incorporating FIG. 1. As illustrated in FIG. 1, the embodiment includes:

Step 101: The length of the root sequence is determined;

Step 102: A set of ZCZ lengths is selected so that, for any cell radius, the maximum number of preambles determined from a ZCZ length which is selected from the selected set of ZCZ lengths, and is applicable to the cell and capable of determining a maximum number of preambles, is closest to the maximum number of preambles obtained from a ZCZ length which is selected from the set of all integers, and is applicable to the cell and capable of determining a maximum number of preambles, wherein the maximum number of preambles is determined from the length of the root sequence and a ZCZ length selected.

In an embodiment of the disclosure, it should be ensured that the product of a ZCZ length and the symbol period of the sequence is greater than the sum of the round trip time and the delay spread of a cell, i.e., $T \times T_s > T_r + T_d$, in which, T is the length of ZCZ, $T_s$ is the symbol period, $T_r$ is the round trip time, and $T_d$ is the delay spread.

Since the maximum round trip time $T_r$ in a cell is determined by the cell radius R, i.e., $T_r = 2R/c$, where c is the speed of light, $T \times T_s > T_r + T_d$ may be rewritten as $T \times T_s > 2R/c + T_d$.

Furthermore, since $T = N_{CS} - 1$, $T \times T_s > 2R/c + T_d$ may be rewritten as $(N_{CS} - 1) \times T_s > 2R/c + T_d$. Therefore, $N_{CS} > 1 \pm (2R/c + T_d)/T_s$.

Additionally, since $N_{pre} = \lfloor N_{ZC}/N_{CS} \rfloor$, $N_{pre} < \lfloor N_{ZC}/(1 + (2R/c + T_d)/T_s) \rfloor$. Thus, $N_{pre}$ may be a function of the cell radius R. Of course, the cell radius may also be varying; and the value of $N_{pre}$ decreases as the value of $N_{CS}$ increases.

In an embodiment of the disclosure, a limited set of $N_{CS}$ values is constructed, i.e., for a certain cell radius, the $N_{pre}$ corresponding to the minimum $N_{CS}$ value which is selected from the limited set and is applicable to the cell, is closest to the $N_{pre}$ corresponding to the minimum $N_{CS}$ value which is selected from the set of all integers and is applicable to the cell. Furthermore, a maximum relative difference may be constructed from $N_{pre}$. This maximum relative difference is between the $N_{pre}(R)$, which is determined from the minimum $N_{CS}$ value selected from the set of integers and is applicable to the cell, and the $N_{pre}(R)$, which is determined from the minimum $N_{CS}$ value selected from the limited set and is applicable to the cell. If the finally determined or selected limited set is such a set that the maximum relative difference between the $N_{pre}(R)$, which is determined from the minimum $N_{CS}$ value selected from the set of integers and is applicable to the cell, and the $N_{pre}(R)$, which is determined from the minimum $N_{CS}$ value selected from the limited set and is applicable to the cell, is minimized in a cell of any radius, this limited set is a required one.

Figure 2:
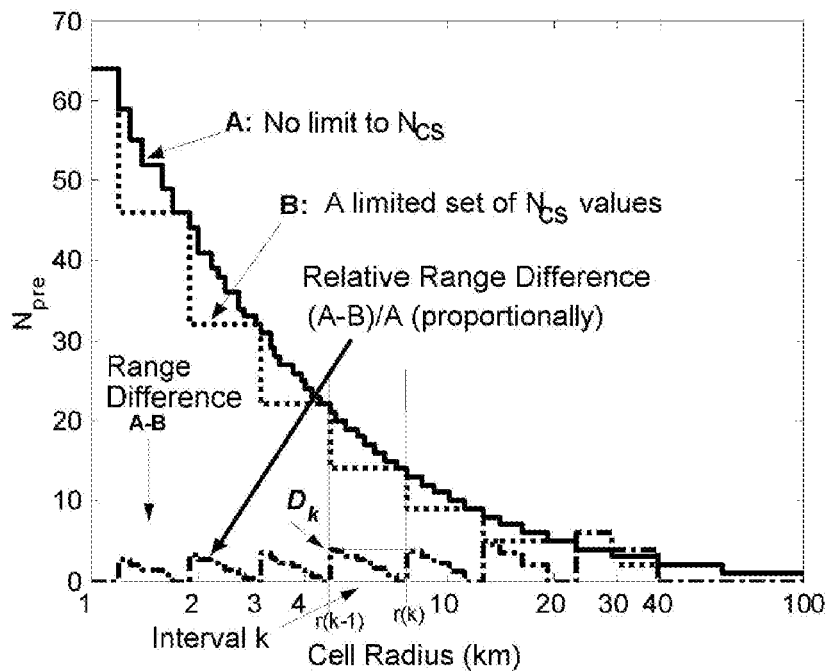
FIG. 2 is a diagram illustrating the relationship between the maximum number of preambles and the cell radius according to an embodiment of the disclosure.

As illustrated in FIG. 2, curve A indicates that for any one cell radius, an integer from the set of all integers may be selected as $N_{CS}$ of the cell, wherein a maximum number of preamble sequences may be generated based on the integer selected, and the generated preamble sequences are applicable to the cell. Curve B indicates a set of $N_{CS}$ including a limited number of $N_{CS}$. When the limited number of $N_{CS}$ is applied in cells of all radii, within a certain interval of cell radii, a same $N_{CS}$ will be used for all cell radii. Thus, the $N_{CS}$ should be determined according to the maximum cell radius in the interval of cell radii. Compared with A, the preamble number generated according to B decreases.

Under these conditions, if the selected limited set ensures that the maximum relative difference between the $N_{pre}(R)$ determined from a $N_{CS}$ value selected from any integer and the $N_{pre}(R)$ determined from a $N_{CS}$ value selected from the limited set is minimized, and it is assumed that the $N_{pre}(R)$ determined from a $N_{CS}$ value selected from any integer is A(R) and the $N_{pre}(R)$ determined from a $N_{CS}$ value selected from the limited set is B(R), and then A(R) and B(R) are respectively illustrated in FIG. 2.

As seen from FIG. 2, there is a small deviation between A(R) and B(R). For a certain cell radius R, the deviation of B(R) from A(R) for some cell radius R may increase the number of required root sequences for that cell radius R. The increase of the number of root sequences becomes very important for large cell radii where $N_{pre}$ is small. For example, if A(R)=3 and B(R)=2, the number of root sequences increases significantly, from $\lceil 64/3 \rceil = 22$ to $\lceil 64/2 \rceil = 32$. An appropriate measure of the deviation of B from A should therefore weigh the difference A-B with higher weight for small $N_{pre}$, e.g. by considering the maximum relative difference between A(R) and B(R), i.e., [A(R)−B(R)]/A(R). We will adopt the maximum relative difference between A(R) and B(R) over all cell radii as the measurement of the deviation of B(R) from A(R), and find a set of $N_{CS}$ values that minimizes this measurement. This set may consist of one $N_{CS}=0$ and K+1 non-zero $N_{CS}$ values. The total number of $N_{CS}$ values in the set is K+2.

For example, in a relatively small cell, it would be possible to generate 64 ZCZ preambles from a single root sequence if $N_{CS} = \lfloor N_{ZC}/64 \rfloor$. This value is the smallest value in the set $N_{CS}(k)$.

The maximum value, $N_{CS}(K)$, is the one that allows for having 2 ZCZ sequences from a set single root sequence, so it is $\lfloor N_{ZC}/2 \rfloor$.

For the largest cells there is only one RAP generated from each root sequence. Therefore, $N_{CS}(K+1)=0$.

The maximum relative difference between A(R) and B(R), i.e., [A(R)−B(R)]/A(R), is non-increasing with radius R within the interval of [(r(k−1), r(k)] and the interval being k, as illustrated in FIG. 2. In FIG. 2, r(k) denotes the kth cell radius arranged orderly from small ones to large ones. The reason is that B(R) is constant in the interval, whereas A is inversely proportional to the smallest possible $N_{CS}$ for given R. This value of $N_{CS}$ increases with the round trip time and hence with R.

If it is assumed that the maximum number of preamble sequences of the set A(R) is $N_{pre}(k-1)-1$ in the cell radius interval of [(r(k−1), r(k)], the maximum number of preamble sequences of the set B(R) generated in this interval associate with the cell radius r(k), i.e., the maximum number of preamble sequences is $N_{pre}(k)$. The maximum relative difference $D_k$ in the interval k may be obtained from the following equation:

$$D_k = \frac{N_{pre}(k-1) - 1 - N_{pre}(k)}{N_{pre}(k-1) - 1}$$

If $D_k$ and $N_{pre}(k-1)$ are given, $N_{pre}(k)$ may be obtained by rearranging the above equation, i.e.:

$$N_{pre}(k) = (1 - D_k)(N_{pre}(k-1) - 1)$$

The maximum relative difference $D_{max}$ for all cell radii may be given by $$D_{max} = \max\{D_k\}_{k=1}^{K}.$$

For $N_{pre}(k)$, we will first allow $N_{pre}(k)$ to be a real number, and then round the result to the nearest integer. Additionally, $N_{pre}(0)$ and $N_{pre}(K)$ are fixed.

Then $D_{max}$ is minimized if all $D_k$ are equal, i.e. $D_k=D$, $k=1, 2, \ldots, K$, as will be proved in the following.

A set of values $\{N_{pre}^{(1)}(k)\}_{k=0}^{K}$ is constructed with the constraint that $N_{pre}^{(1)}(k)=N_{pre}(k)$ for $k=0$ and $k=K$, so that $D_k^{(1)}=D$, $k=1, 2, \ldots, K$. For this set, $D_{max}=D$.

Next, another set of values $\{N_{pre}^{(2)}(k)\}_{k=0}^{K}$ is constructed with the constraint that $N_{pre}^{(2)}(k)=N_{pre}(k)$ for $k=0$ and $k=K$, so that $D_{max}<D$, i.e. $D_k^{(2)}<D_k^{(1)}$, $k=1, 2, \ldots, K$.

When $k=1$, since $D_k^{(2)}<D_k^{(1)}$ and $N_{pre}^{(2)}(0)=N_{pre}^{(1)}(0)$, $N_{pre}^{(2)}(1)>N_{pre}^{(1)}(1)$ is obtained according to $N_{pre}(k)=(1-D_k)(N_{pre}(k-1)-1)$.

When $k=2$, since $D_2^{(2)}<D_2^{(1)}$ and $N_{pre}^{(2)}(1)>N_{pre}^{(1)}(1)$, $N_{pre}^{(2)}(2)>N_{pre}^{(1)}(2)$ is obtained according to $N_{pre}(k)=(1-D_k)(N_{pre}(k-1)-1)$.

Similarly, for all k, since $N_{pre}^{(2)}(K)=N_{pre}^{(1)}(K)=N_{pre}(K)$, $N_{pre}^{(2)}(k)>N_{pre}^{(1)}(k)$ is impossible.

Thus, it is impossible to construct a set of values $N_{pre}(k)$ such that $D_{max}<D$, which proves that $D_{max}$ is minimized if all $D_k$ are equal, i.e. $D_k=D$, $k=1, 2, \ldots, K$.

In this way, the set of values $\{N_{pre}(k)\}_{k=0}^{K}$ which minimizes $D_{max}$ may be found.

Replacing $D_k$ by D in $N_{pre}(k)=(1-D_k)(N_{pre}(k-1)-1)$ and rearranging the equation, a linear difference equation is obtained as follows:

$$N_{pre}(k) - aN_{pre}(k-1) = -a, \text{ wherein } a=(1-D).$$

By recursion, it is obtained from the above equation:

$$N_{pre}(k) = N_{pre}(0)a^k + \frac{a}{1-a}(a^K - 1) \quad (3)$$

From the above equation and the boundary conditions $N_{pre}(0)$ and $N_{pre}(K)$, a may be determined numerically.

For example, the maximum number of preambles generated from one root sequence is 64, i.e., $N_{pre}(0)=64$. The minimum number of preamble obtained by cyclic shift is 2, for example, $N_{pre}(14)=2$. Thus, $a=0.856$ may be obtained from these two parameters, and all $N_{pre}(k)$, $k=1, 2, \ldots$ may further be obtained.

The maximum relative difference is minimized through an approximate minimization by a sub-optimal algorithm, i.e., by minimizing the maximum relative difference for fictive real-valued maximum number of ZCZ RAPs, and the maximum number of the ZCZ RAPs is thereafter quantized. The method is specified below.

By first rounding the fictive real-valued $N_{pre}(k)$ in $$N_{pre}(k) = N_{pre}(0)a^k + \frac{a}{1-a}(a^k - 1),$$

the following equation is obtained:

$$N_{CS}(k) = \lfloor N_{ZC}/[N_{pre}(0) \times a^k + a/(1-a) \times (a^k - 1)] \rfloor \quad (4)$$

where $\lfloor x \rfloor$ denotes the maximum integer not greater than x, $N_{ZC}$ is the length of the root sequence, $N_{pre}(0)$ denotes the maximum number of preambles generated from the root sequence.

Still taking the above example as an example, if $N_{pre}(0)=64$ and $N_{pre}(14)=2$, $a=0.856$ is obtained based on equation (3). Next, when $N_{ZC}=839$, $N_{cs}(k)$, $k=0, 1, 2, \ldots, 14$ obtained based on equation (4) is illustrated in table 1:

TABLE 1

| k | $N_{CS}(k)$ |
|---|---|
| 0 | 13 |
| 1 | 15 |
| 2 | 18 |
| 3 | 22 |
| 4 | 26 |
| 5 | 32 |
| 6 | 38 |
| 7 | 46 |
| 8 | 59 |
| 9 | 76 |
| 10 | 93 |
| 11 | 119 |
| 12 | 167 |
| 13 | 279 |
| 14 | 419 |

If only one preamble sequence is obtained for a very large cell, which is the sequence itself, then $N_{CS}=0$. Adding this value into the above table, table 2 is obtained:

TABLE 2

| k | $N_{CS}(k)$ |
|---|---|
| 0 | 13 |
| 1 | 15 |
| 2 | 18 |
| 3 | 22 |
| 4 | 26 |
| 5 | 32 |
| 6 | 38 |
| 7 | 46 |
| 8 | 59 |
| 9 | 76 |
| 10 | 93 |
| 11 | 119 |
| 12 | 167 |
| 13 | 279 |
| 14 | 419 |
| 15 | 0 |

Figure 3:
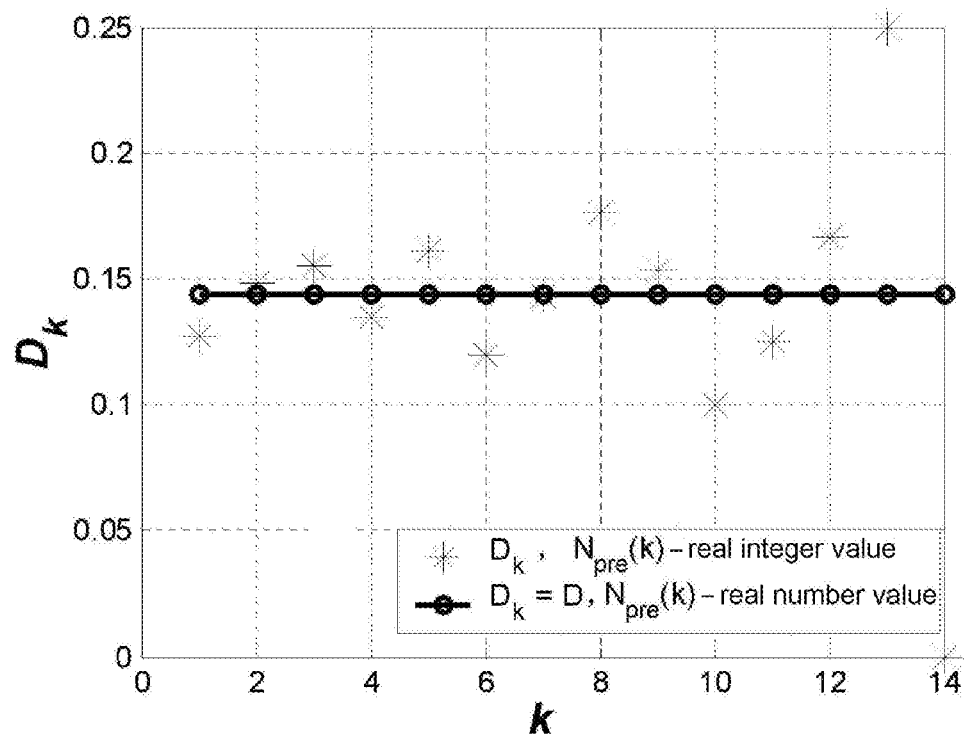
FIG. 3 is a diagram illustrating the value of maximum relative difference in the cell radius interval k according to an embodiment of the disclosure.

Finally, the true integer value of $N_{pre}(k)$ is obtained from $N_{pre}(k) = \lfloor N_{ZC}/N_{CS}(k) \rfloor$ that for some values of k $N_{ZC}/N_{CS}(k)$ are greater than the rounded values $N_{pre}(k)$. As illustrated in FIG. 3, when K=14, the value of $D_k$ obtained from the real number value of $N_{pre}(k)$ is D=0.144. It can be seen from FIG. 3 that the true integer values of $N_{pre}(k)$ will cause $D_k$ to deviate from D. But the deviation is still very small for all cells except the two largest cells. Thus, the selected limited set of values of $N_{CS}$ is applicable.

It should be noted that if the limited set of values of $N_{CS}$ is determined, the limited set of lengths of ZCZ may also be determined, for instance, according to $T=N_{CS}-1$.

Figure 4:
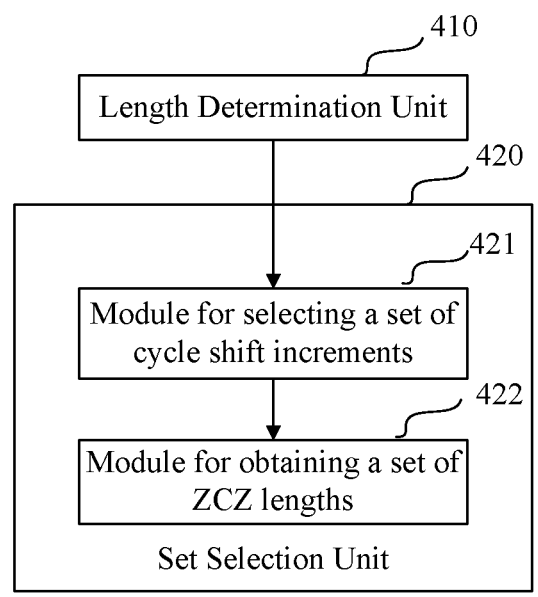
FIG. 4 is a block diagram of the base station according to an embodiment of the disclosure.

Correspondingly, the disclosure provides an embodiment of an apparatus of determining a set of ZCZ lengths. As illustrated in FIG. 4, the apparatus includes: a length determination unit 410, configured to determine a length of a root sequence; and a set selection unit 420, configured to select such a set of ZCZ lengths that, for any cell radius, the maximum number of preambles determined from a ZCZ length which is selected from the selected set of ZCZ lengths, and is applicable to the cell and capable of determining a maximum number of preambles, is closest to the maximum number of preambles determined from a ZCZ length which is selected from the set of all integers, and is applicable to the cell and capable of determining a maximum number of preambles, wherein the maximum number of preambles is determined by the length of the root sequence and a ZCZ length selected.

The set selection unit 420 may include: a module 421 adapted for the selection of a set of cyclic shift increments, wherein, the module 421 is configured to select such a set of cyclic shift increments that, for any cell radius, the maximum number of preambles determined from a cyclic shift increment which is selected from the selected set of cyclic shift increments, and is applicable to the cell, is closest to the maximum number of preambles determined from a cyclic shift increment which is selected from the set of all integers and is applicable to the cell, wherein the maximum number of preambles is determined by the root sequence length and a cyclic shift increment selected; and a module 422 adapted to obtain a set of ZCZ lengths, wherein the module is configured to obtain the set of ZCZ lengths according to the selected set of cyclic shift increments.

In above apparatus embodiment, the cyclic shift increment selected from the selected set of cyclic shift increments is the minimum cyclic shift increment in the selected set of cyclic shift increments; and the cyclic shift increment selected from the set of all integers is the minimum cyclic shift increment in the set of all integers.

The disclosure provides an embodiment of a base station, as illustrated in FIG. 4, which includes: a length determination unit 410, configured to determine a length of a root sequence; and a set selection unit 420, configured to select such a set of ZCZ lengths that, for any cell radius, the maximum number of preambles determined from a ZCZ length which is selected from the selected set of ZCZ lengths, and is applicable to the cell and capable of determining a maximum number of preambles, is closest to the maximum number of preambles determined from a ZCZ length which is selected from the set of all integers, and is applicable to the cell and capable of determining a maximum number of preambles, wherein the maximum number of preambles is determined from the length of the root sequence and a ZCZ length selected.

Figure 5:
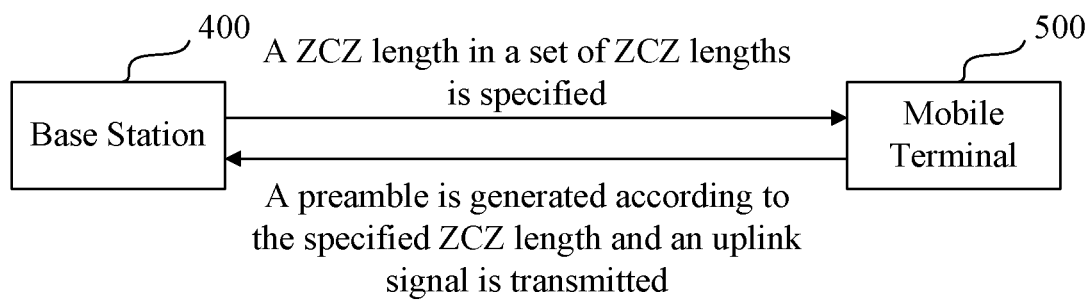
FIG. 5 is a diagram illustrating the mobile communication system according to an embodiment of the disclosure.

The disclosure further provides an embodiment of a mobile communication system, as illustrated in FIG. 5. The system comprises a base station 400 and a mobile terminal 500. The base station 400 is configured to interact with the mobile terminal 500, and to specify a ZCZ length from a set of ZCZ lengths for the mobile terminal 500; the mobile terminal 500 is configured to generate a preamble according to the ZCZ length specified by the base station 400, and to transmit an uplink signal to the base station 400 using the preamble; the set of ZCZ lengths is such a set of ZCZ lengths that, for any cell radius, the maximum number of preambles determined from a ZCZ length which is selected from the selected set of ZCZ lengths, and is applicable to the cell and capable of determining a maximum number of preambles, is closest to the maximum number of preambles determined from a ZCZ length which is selected from the set of all integers, and is applicable to the cell and capable of determining a maximum number of preambles, wherein the maximum number of preambles is determined from the length of the root sequence and a ZCZ length selected.

In above embodiment of the mobile communication system, the cyclic shift increment selected from the selected set of cyclic shift increments is the minimum cyclic shift increment applicable to the cell in the selected set of cyclic shift increments, the cyclic shift increment selected from the set of all integers is the minimum cyclic shift increment applicable to the cell in the set of all integers.

In general, in embodiments of the disclosure, the selected limited set of $N_{CS}$ values should be such a set that, in a plurality of intervals of cell radii, the maximum relative difference between the maximum number of the ZCZ RAPs determined from the minimum $N_{CS}$ value of the limited set, which is applicable to the plurality of cells, and the maximum number of the ZCZ RAPs determined from a plurality of $N_{CS}$ values of a set of integers which are applicable to the plurality of cells is minimized. Furthermore, a limited set of ZCZ lengths may be selected. Of course, in a plurality of intervals of cell radii, the maximum relative difference between the maximum number of the ZCZ RAPs determined from the minimum ZCZ length of the limited set of ZCZ lengths, which is applicable to the plurality of cells, and the maximum number of the ZCZ RAPs determined from a plurality of ZCZ lengths of the set of all integers which are applicable to the plurality of cells is minimized.

What are described above are only preferred embodiments of the disclosure. It should be noted that, for a person skilled in the art, variations and improvements may be made without deviating from the principle of the disclosure. Those variations and improvements are all regarded to be within the scope of the disclosure.

What is claimed is:

1. A communication method performed by a base station in a wireless communication network, comprising:
    notifying a terminal of a cyclic shift increment $N_{CS}$ configuration information indicating an $N_{CS}$ value, which belongs to a set of cyclic shift increments including all of the following cyclic shift increments of 0, 13, 15, 18, 22, 26, 32, 38, 46, 59, 76, 93, 119, 167, 279, 419, wherein the $N_{CS}$ value indicates a length of Zero Correlation Zones of a random access preamble is $N_{CS}-$; and
    receiving from the terminal the random access preamble with Zero Correlation Zones of length $N_{CS}-1$.

2. The communication method according to claim 1, further comprising:
    determining a time advance in accordance with the random access preamble; and
    transmitting the time advance to the terminal.

3. The communication method according to claim 1, further comprising:
    sending a downlink synchronization signal to the terminal to get downlink synchronized with the terminal.

4. The communication method according to claim 1, wherein the $N_{CS}$ value of 0 in the set of cyclic shift increments represents one preamble sequence is generated from one root sequence.

5. The communication method according to claim 4, wherein the $N_{CS}$ value of 0 in the set of cyclic shift increments represents a same cyclic shift as an $N_{CS}$ value of 839.

6. The communication method according to claim 1, wherein the random access preamble belongs to a set of random access preambles.

7. The communication method according to claim 6, wherein the set of random access preambles is derived from at least one Zadoff-Chu sequence.

8. The communication method according to claim 7, wherein the at least one Zadoff-Chu sequence is used in generation of a sequence $x_{u,v}(k)$ for the set of random access preambles, the sequence $x_{u,v}(k)$ is given by:
    $x_{u,v}(k) = x_u((k+vN_{CS}) \bmod N_{ZC})$, where u and v are integers, $N_{ZC}$ is a length of the at least one Zadoff-Chu sequence.

9. The communication method according to claim 7, wherein random access preambles derived from a same Zadoff-Chu sequence in the set of random access preambles being with zero correlation zones of length $N_{CS}-1$.

10. The communication method according to claim 7, wherein the number of preambles derived from a single root sequence is Npre=$\lfloor N_{ZC}/N_{CS} \rfloor$, and $N_{ZC}$ is the length of the Zadoff-Chu sequence.

11. The communication method according to claim 6, wherein the number of random access preambles in the set of random access preambles is 64.

12. The communication method according to claim 1, wherein non-zero cyclic shift increments $N_{CS}(k)$ in the set of cyclic shift increments are derived in accordance with the following formula:

$N_{CS}(k) = \lfloor N_{ZC}/\lceil N_{pre}(0) \times a^k + a/(1-a) \times (a^k-1) \rceil \rfloor$, $k=0,1, 2 \ldots K$;

wherein $\lfloor \ \rfloor$ denotes a rounding down operation, $\lceil \ \rceil$ denotes a rounding operation, a=0.856, $N_{pre}(0)$=64, $N_{ZC}$=839, and K=14.

13. The communication method according to claim 12, wherein the value a=0.856 is obtained from the following formula:

$$N_{pre}(k) = N_{pre}(0)a^k + \frac{a}{1-a}(a^k - 1),$$
$$k = 1, 2 \ldots \text{ where } N_{pre}(14) = 2.$$

14. A base station operable to communicate in a wireless communications network, the base station comprising:
a processor; and
a non-transitory computer readable storage medium storing programming for execution by the processor coupled to the storage medium, the programming including instructions that direct the base station to:
notify a terminal of a cyclic shift increment $N_{CS}$ configuration information indicating an $N_{CS}$ value, which belongs to a set of cyclic shift increments including all of the following cyclic shift increments of 0, 13, 15, 18, 22, 26, 32, 38, 46, 59, 76, 93, 119, 167, 279, 419, wherein the $N_{CS}$ value indicates a length of Zero Correlation Zones of a random access preamble is $N_{CS}$-1; and
receive from the terminal the random access preamble with Zero Correlation Zones of length $N_{CS}$-1.

15. The base station according to claim 14, wherein the programming further includes instructions that direct the base station to:
determine a time advance in accordance with the random access preamble; and
transmit the time advance to the terminal.

16. The base station according to claim 14, wherein the programming further includes instruction that direct the base station to:
send a downlink synchronization signal to the terminal to get downlink synchronized with the terminal.

17. The base station according to claim 14, wherein the $N_{CS}$ value of 0 in the set of cyclic shift increments represents one preamble sequence is generated from one root sequence.

18. The base station according to claim 17, wherein the $N_{CS}$ value of 0 in the set of cyclic shift increments represents a same cyclic shift as an $N_{CS}$ value of 839.

19. The base station according to claim 14, wherein the random access preamble belongs to a set of random access preambles.

20. The base station according to claim 19, wherein the set of random access preambles is derived from at least one Zadoff-Chu sequence.

21. The base station according to claim 20, wherein the at least one Zadoff-Chu sequence is used in generation of a sequence $x_{u,v}(k)$ for the set of random access preambles, the sequence $x_{u,v}(k)$ is given by:
$x_{u,v}(k)=x_u((k+vN_{CS}) \bmod N_{ZC})$, where u and v are integers, $N_{ZC}$ is a length of the at least one Zadoff-Chu sequence.

22. The base station according to claim 20, wherein random access preambles derived from a same Zadoff-Chu sequence in the set of random access preambles being with zero correlation zones of length $N_{CS}$-1.

23. The base station according to claim 20, wherein the number of preambles derived from a single root sequence is Npre=$\lfloor N_{ZC}/N_{CS} \rfloor$, and $N_{ZC}$ is the length of the Zadoff-Chu sequence.

24. The base station according to claim 19, wherein the number of random access preambles in the set of random access preambles is 64.

25. The base station according to claim 14, wherein non-zero cyclic shift increments $N_{CS}(k)$ in the set of cyclic shift increments are generated from the following formula:

$N_{CS}(k) = \lfloor N_{ZC}/\lceil N_{pre}(0) \times a^k + a/(1-a) \times (a^k-1) \rceil \rfloor$, $k=0,1, 2 \ldots K$;

wherein $\lfloor \ \rfloor$ denotes a rounding down operation, $\lceil \ \rceil$ denotes a rounding operation, a=0.856, $N_{pre}(0)$=64, $N_{ZC}$=839, and K=14.

26. The base station according to claim 25, wherein the value a=0.856 is obtained from the following formula:

$$N_{pre}(k) = N_{pre}(0)a^k + \frac{a}{1-a}(a^k - 1)$$
$$k = 1, 2 \ldots \text{ where } N_{pre}(14) = 2.$$

* * * * *